United States Patent
Yook et al.

(10) Patent No.: US 9,323,451 B2
(45) Date of Patent: Apr. 26, 2016

(54) METHOD AND APPARATUS FOR CONTROLLING DISPLAY OF ITEM

(75) Inventors: Hyung Min Yook, Seoul (KR); Jae Joon Hwang, Seoul (KR); Bong Won Lee, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 480 days.

(21) Appl. No.: 13/468,402

(22) Filed: May 10, 2012

(65) Prior Publication Data

US 2012/0287154 A1    Nov. 15, 2012

(30) Foreign Application Priority Data

May 11, 2011    (KR) .......... 10-2011-0043911

(51) Int. Cl.
| | |
|---|---|
| G06F 3/048 | (2013.01) |
| G06T 11/00 | (2006.01) |
| G06T 11/60 | (2006.01) |
| G06T 3/00 | (2006.01) |
| G06F 3/0488 | (2013.01) |

(52) U.S. Cl.
CPC ........ *G06F 3/04883* (2013.01); *G06F 3/04886* (2013.01)

(58) Field of Classification Search
USPC ......... 345/418, 581, 619–625, 629–630, 636, 345/642, 650, 156, 173–174, 179, 520; 715/200, 209, 273, 700, 761–763, 764, 715/765, 810, 818–820, 828–829, 769, 864, 715/965, 961, 967, 835, 702

IPC ............ G06T 11/001,11/60, 11/00, 3/14; G06F 3/0482, 8/34, 3/0481; G09G 5/00
See application file for complete search history.

(56) References Cited

U.S. PATENT DOCUMENTS

| | | | |
|---|---|---|---|
| 6,272,537 B1* | 8/2001 | Kekic et al. ................... | 709/223 |
| 6,421,042 B1* | 7/2002 | Omura et al. ................. | 345/157 |
| 6,731,267 B1* | 5/2004 | Tuoriniemi et al. .......... | 345/156 |
| 7,769,794 B2* | 8/2010 | Moore et al. ................. | 707/831 |
| 7,936,341 B2* | 5/2011 | Weiss ............................. | 345/173 |
| 2003/0013483 A1* | 1/2003 | Ausems et al. ............... | 455/556 |
| 2005/0246631 A1* | 11/2005 | Mori et al. .................... | 715/515 |
| 2005/0289182 A1* | 12/2005 | Pandian et al. ............ | 707/104.1 |
| 2006/0129933 A1* | 6/2006 | Land et al. .................... | 715/723 |
| 2007/0198561 A1 | 8/2007 | Lee et al. | |
| 2007/0276809 A1* | 11/2007 | Yoshida ............................. | 707/3 |
| 2008/0184112 A1 | 7/2008 | Chiang et al. | |
| 2008/0297482 A1 | 12/2008 | Weiss | |
| 2009/0222766 A1* | 9/2009 | Chae et al. .................... | 715/835 |

(Continued)

FOREIGN PATENT DOCUMENTS

| | | |
|---|---|---|
| CN | 101308443 A | 11/2008 |
| CN | 100472534 C | 3/2009 |

(Continued)

*Primary Examiner* — Wesner Sajous
(74) *Attorney, Agent, or Firm* — Cha & Reiter, LLC.

(57) ABSTRACT

Provided is a method of controlling display of an item. In the method, a plurality of individual items is displayed. A touch input is detected from at least two of the displayed individual items. An outline of a folder item to be generated is displayed around a plurality of the at least two touched individual items. Upon receiving a touch release input, the folder item is generated and displayed within the outline to arrange the individual items that receive touch inputs therein.

19 Claims, 11 Drawing Sheets

(56) References Cited

U.S. PATENT DOCUMENTS

| | | | |
|---|---|---|---|
| 2010/0088641 A1* | 4/2010 | Choi | 715/828 |
| 2010/0229129 A1 | 9/2010 | Price et al. | |
| 2012/0030628 A1* | 2/2012 | Lee et al. | 715/835 |
| 2012/0036460 A1* | 2/2012 | Cieplinski et al. | 715/769 |
| 2012/0060623 A1* | 3/2012 | Lansing et al. | 73/861.18 |
| 2012/0084732 A1* | 4/2012 | Filippov et al. | 715/838 |
| 2012/0221569 A1* | 8/2012 | Sato | 707/736 |
| 2012/0266098 A1* | 10/2012 | Webber | 715/778 |
| 2014/0040800 A1* | 2/2014 | Fredette et al. | 715/765 |

FOREIGN PATENT DOCUMENTS

| | | |
|---|---|---|
| CN | 102171634 A | 8/2011 |
| EP | 1 818 840 A2 | 8/2007 |
| JP | 2010-182004 A | 8/2010 |
| KR | 10-2007-0107892 A | 11/2007 |
| KR | 10-2009-0113622 A | 11/2009 |
| KR | 10-2011-0038869 A | 4/2011 |

\* cited by examiner

METHOD AND APPARATUS FOR
CONTROLLING DISPLAY OF ITEM

CLAIM OF PRIORITY

This application claims, pursuant to 35 USC 119(a), priority to, and the benefit of the earlier filing date of, that patent application filed in the Korean Patent Office, entitled, "Method and Apparatus for Controlling Display of Item," filed on May 11, 2011 and afforded serial number 10-2011-0043911, the entire contents of which are incorporated by reference herein.

BACKGROUND OF THE INVENTION

1. Field of the Invention

The present invention relates to the field of display screen management and more particularly to a method of controlling display of an item when creating a folder item to organize a plurality of individual items into a group.

2. Description of the Related Art

Generally, in a home screen or a main menu screen of a portable terminal (e.g., a mobile communication terminal) multiple icons may be displayed. Each icon may represent an application or process, which when executed causes the terminal to perform an association function. In case of a smart phone, when a user downloads an application, a "Run" icon of the downloaded application may be displayed on the home screen or the main menu screen. When the Run icon is depressed, corresponding application program may be executed and the operation of the smart phone or portable terminal is directed, in part, to complete the task or function associated with the application program.

Recently, a feature has been added to terminals in which categorized applications are managed in a folder. In this case, the user can create a folder on the home screen or the main menu screen to manage applications classified using the same category in the folder.

However, in a conventional mobile or portable terminal, when the folder is created, only a result of folder creation is displayed and a visual interface of a folder creating process or locating the folder is not provided.

Also, the size of the folder is generally equal to or similar in size to the size of an icon for running the application. Therefore, when a plurality of icons for running applications and folders appear on the screen together, the folder is not easily distinguishable from the icons for running the applications.

SUMMARY OF THE INVENTION

The present invention has been made in view of the above problems, and provides a method of controlling the display of an item in which, when a user creates a folder for containing a plurality of individual items, a visual interface of a folder creating process and for locating the folder is provided.

In addition, the present invention provides a method of controlling the display of an item in which a folder is displayed so that it is distinguished from the individual item.

Further, the present invention provides a display apparatus for performing the above method.

According to an aspect of the present invention, an item display control method comprises displaying a plurality of individual items; detecting a touch input from at least two of the displayed individual items; displaying an outline of a folder item to be generated; and generating and displaying, upon receiving a touch release input, the folder item within the outline to arrange the individual items that receive touch inputs therein.

According to another aspect of the present invention, an item display control method comprises displaying a plurality of individual items; detecting a touch input, a touch position moving motion, and a touch release input from at least two of the displayed individual items; displaying a delete icon on an individual item that receives the touch input and an individual item located on a touch position moving path; displaying an outline of a folder item to be generated; and generating and displaying, upon receiving an input from a particular key, the folder item within the outline to arrange the individual item on which the delete icon is displayed in the folder item.

According to another aspect of the present invention, a display apparatus comprises a display unit configured to display a plurality of individual items; a touch sensor unit configured to detect a touch input from at least two individual items among the displayed individual items; and a controller configured to determine a location of a folder item to be generated based on the touch inputs received, configured to display an outline of the folder item on the determined location on the display unit, configured to generate the folder item within the outline to arrange the individual items that receive the touch inputs in the folder item upon detecting a touch release input by the touch sensor unit, and configured to control the display unit to display the generated folder item.

According to the present invention, when creating a folder, the outline of a folder to be created is displayed so that the user may appreciate the location and the shape of the folder before the folder is created. Also, the folder is displayed as having a size different from that of the individual item so that the folder can be easily distinguishable from the individual item.

BRIEF DESCRIPTION OF THE DRAWINGS

The above features and advantages of the present invention will be more apparent from the following detailed description in conjunction with the accompanying drawings, in which.

DETAILED DESCRIPTION OF THE INVENTION

As used herein, the term "item" refers to a graphic object displayed on a home screen or main menu screen. The term "individual item" refers to an item for running an application or an item that provides an interface for a particular function such as, for example, a contact icon for communicating with a particular contact or provides a history of communication with the particular contact. The term "folder item" refers to an item that provides an interface for managing a plurality of individual items in each category. The folder item includes a plurality of the individual items, which do not appear on the home screen. When a user selects the folder item, the individual items contained in the folder item are displayed.

A display apparatus according to the present invention can be implemented as a portable terminal as well as a non-portable terminal such as a TV and a monitor. The portable terminal can include an information communication device and/or a multimedia device such as, for example, a mobile communication terminal, a portable multimedia player (PMP), a personal digital assistant (PDA), an MP3 player or combinations of these devices. In the following description, the display apparatus is referred to as a mobile communication terminal. However it should be recognized that the reference to the mobile communication terminal is merely to describe the invention as expressed in the appended claims. It not intended that the application of the invention be limited to mobile communication terminal. Rather the invention claimed is applicable to different types of devices, which would be recognized by those skilled in the art.

Figure 1:
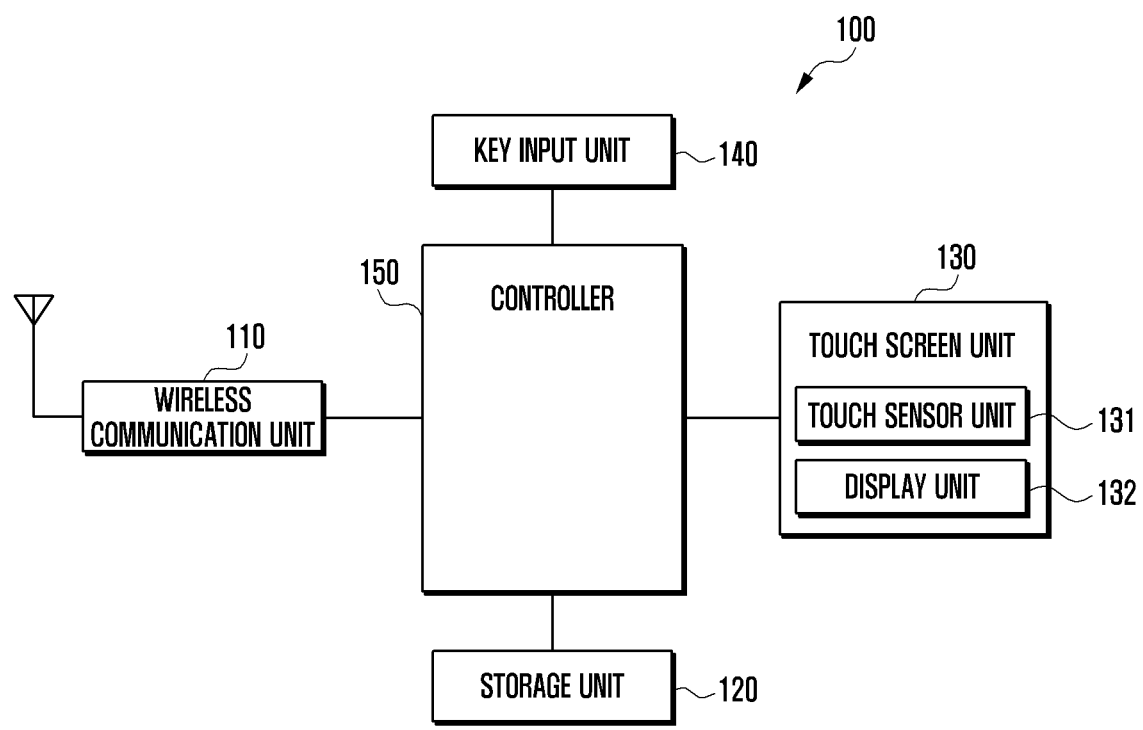
FIG. 1 is a block diagram of a display apparatus according to an exemplary embodiment of the present invention.

FIG. 1 is a block diagram of a display apparatus 100 according to an exemplary embodiment of the present invention. The display apparatus 100 includes a wireless communication unit 110, a storage unit 120, a touch screen unit 130, a key input unit 140 and a controller 150.

The wireless communication unit 110 transmits and receives data for performing wireless communication associated with the display apparatus 100. The wireless communication unit 110 includes an RF transmitter (not shown) for performing frequency up-conversion and frequency amplification on a transmission signal and an RF receiver (not shown) for performing low noise amplification and frequency down-conversion on a received signal. Also, the wireless communication unit 110 receives data through a wireless channel to be output to the controller 150 and sends data output from the controller 150 through the wireless channel. The wireless communication unit 110 may also receive application-associated data from an external server through a mobile communication network (not shown) to be transmitted to the controller 150.

The storage unit 120 stores a program area (not shown) and a data area (not shown) for operating the display apparatus 100. For example, the storage unit 120 can include an operating system (OS) for booting the display apparatus 100, an application, and data, e.g., an image file, an audio file or a video file. In the present invention, the storage unit 120 stores a program in the program area for arranging individual items and creating a folder item using the individual items.

The touch screen 130 includes a touch sensor unit 131 and a display unit 132. The touch sensor unit 131 detects a touch input from the user. Preferably, the touch sensor unit 131 is a capacitive overlay touch sensor. However, the touch sensor unit 131 of the present invention can be any type of sensor that can detect a touch by an object. The touch sensor unit 131 detects the touch input of the user and generates a detection signal that is sent to the controller 150. The detection signal includes a coordinate data of the touch input of the user. When the user enters a motion to move a touch to another position, the touch sensor unit 131 sends the detection signal including the coordinate data of the touch position moving path to the controller 150.

The display unit 132 may be composed of well-known display technologies, such as a liquid crystal display (LCD), an organic light emitting diode (OLED), and an active matrix organic light emitting diode (AMOLED). The display unit 132 displays a home screen or a main menu screen having a plurality of individual items. When the display apparatus 100 enters a folder item creating process, the display unit 132 displays an outline of the folder item to be created as well as the individual items. Also, when a command for completing the creation of the folder item is received, the display unit 132 displays a created folder item within the outline, as will be described in further detail.

The key input unit 140 generates an input signal corresponding to a key manipulation of the user for controlling the display apparatus 100 and transmits the input signal to the controller 150. The input unit 140 can include a key pad having a number key and an arrow key. Also, the key input unit 140 can include at least one function key formed on one side of the display apparatus 100. In one exemplary embodiment of the present invention, if the display apparatus 100 can be manipulated by using only the touch screen unit 130, the key input unit 140 can be omitted. Alternatively, may be displayed on the display unit 132 as a virtue keyboard that is accessed through the touch sensor unit 311.

The controller 150 controls an overall operation of the display device 100. The controller 150 of the present invention displays a plurality of individual items through the display unit 132. When the controller 150 detects a touch input from at least two individual items through the touch sensor unit 131, a location of the folder item to be generated is determined such that at least one of the at least two individual items that receive the touch input is included therein. The controller 150 controls the display unit 132 to display the outline of the folder item to be generated on the determined location. When the controller 150 detects a touch release input from the touch sensor unit 131, the controller 150 generates a folder item that groups the individual items that receive touch input and controls the display unit 132 to display the generated folder item.

In this exemplary embodiment, the controller 150 creates the folder item having a size corresponding to a total size of a given number of individual items and controls the display unit 132 to display it. Also, the controller 150 controls the display unit 132 such that the folder item is configured to have an image of one of the individual items that receive the touch input.

In the exemplary embodiment described herein, the controller determines, when a touch position moving motion is detected after a touch input is received from at least two individual items through the touch sensor unit 131, the location of the folder item to be generated and displays the outline of the folder item to be generated through the display unit 132.

In another exemplary embodiment of the present invention, when displaying the outline, the controller 150 determines the number of individual items that receive the touch input, determines the size of the folder item to be generated depending on the determined number of the individual items, determines the location of the folder item to be generated such that at least one of the individual items that receive the touch input is included therein, and controls the display unit 132 to display the outline of the folder item to be generated on the determined location.

In still another exemplary embodiment of the present invention, the controller 150 controls the display unit 132 to display a plurality of individual items. When the touch input, the touch position moving motion, and the touch release input are received from at least two individual items through the touch sensor unit 131, a delete icon is displayed through the display unit 132 on the individual item that receives the touch input or on the individual item positioned on the touch position moving path. Also, the outline of the folder item to be created is displayed through the display unit 132. When an input from a verification key provided in the key input unit 140 or the touch screen unit 130 is detected, a folder item for grouping the individual items on which the delete icon is displayed is generated and the display unit 132 is controlled to display the generated folder item.

In this exemplary embodiment, when an input from the delete icon is detected through the touch sensor unit 131, the controller 150 controls the display unit 132 to display a screen in which the delete icon is removed from the corresponding individual item. When a touch on the outline is entered and the motion to move the touch position is detected thereafter through the touch sensor unit 131, the display unit 132 is controlled to display the outline that has been moved according to the touch position moving motion.

In the above, display apparatus 100 according to the exemplary embodiment it would be recognized that the controller may be composed of a one or more processors in communication with a memory, the memory being local to the processor or may the memory may be comparable to the storage unit 130. Within the memory may be stored programs in the form of software code, which when accessed by the processors causes the processors to execute the processing steps described herein.

Figure 2:
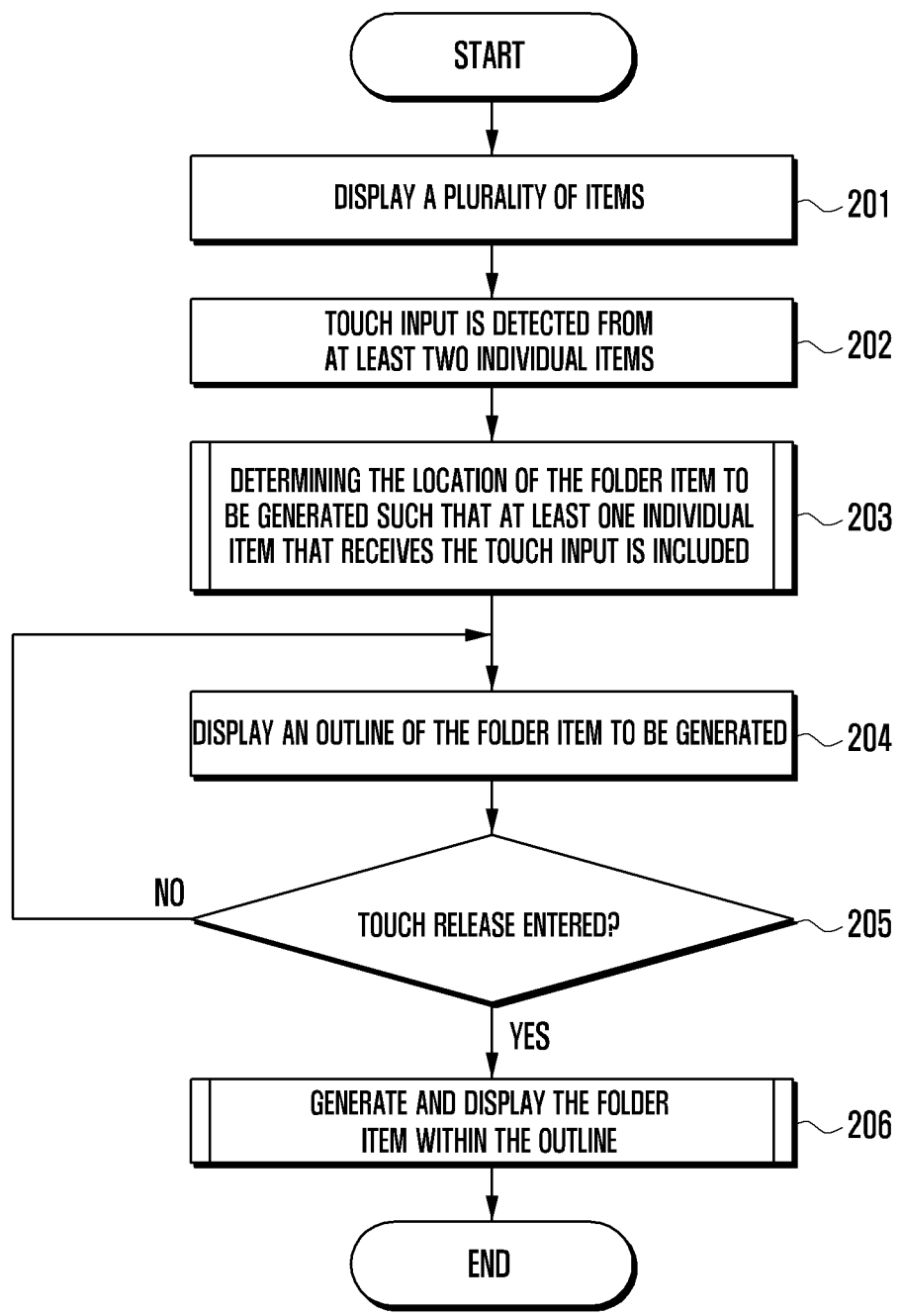
FIG. 2 is a flow chart illustrating an item display control method of a display apparatus according to an exemplary embodiment of the present invention.

FIG. 2 is a flow chart illustrating an item display control method of the display apparatus 100 according to an exemplary embodiment of the present invention.

The controller 150 causes the display unit 132 to display a plurality of individual items (201) on a home screen or a main menu screen. In the present invention, the individual item includes an item for running an application or an item that provides an interface for performing a particular function, such as a contact icon for communicating with a particular contact.

When the user enters a touch input on a plurality of individual items, the controller 150 detects or receives the touch input from at least two of the plurality of individual items through the touch sensor unit 131 (202).

When the touch input is detected (received) from the at least two individual items, the controller 150 determines the location of the folder item to be generated such that at least one individual item that receives the touch input is included therein (203). That is the location of the folder is determined based on those at least two individual items that were selected. The selection being based on the touch input received.

In the present invention, the folder item is an item that provides an interface for managing a plurality of the individual items of each category, and has a size corresponding to a total size of a given number of the individual items. For example, the folder item can have a size corresponding to a total size of 4 individual items. When the number of the individual items that receive the touch input is three, the controller 150 determines the location of the folder item to be generated such that the three individual items of which touch inputs are received are included therein. Alternatively, the controller 150 can determine the location of the folder item to be generated to include a part of the individual items that receive the touch input.

Next, the controller 150 controls the display unit 132 to display the outline of the folder item to be generated as being placed on the location determined at step 203 (204). The outline of the folder item serves to inform the user of the location and the shape of the folder item to be generated.

The controller 150 determines whether the touch release is entered through the touch sensor unit 131 (205). A touch is released from the individual item when the user completes the folder item creating process. When the touch is not released, the controller 150 returns to step 204 to control the display unit 132 to maintain the display of the outline. When the touch is released, the controller 150 generates the folder item within the displayed outline and controls the display unit 132 to display the generated folder item. Here, the generated folder item corresponds to a folder item for grouping the individual items that receive the touch input. The controller 150 can configure an image of the folder item to be an image associated with one of the individual items included in the folder.

According to one exemplary embodiment of the present invention, the controller 150 can determine whether the touch input is received from at least two individual items and the touch position moving motion is entered thereafter by using the touch sensor unit 131 (202). Here, the controller 150 can determine whether multiple touch position moving motions that are directed toward a particular point are received through the touch sensor unit 131. For example, when the user touches the individual items by a thumb, an index finger and a middle finger and places the three fingers together, the controller 150 can determine that the multiple touch position moving motions directed toward the particular point are entered.

According to an exemplary embodiment of the present invention, when the folder item is created at step 206, the controller 150 controls the display 132 to display an image of integrating the individual items that receive the touch input within the outline and display a completed folder item. By providing an image of integrating the individual items, the user is able to recognize which individual items are included in the folder item.

According to an exemplary embodiment of the present invention, the controller 150 determines the number of the individual items that receive the touch input, determines the size of the folder item to be generated, and determines the location of the folder item to include at least one of the individual items from which a touch input was received (203).

According to an exemplary embodiment of the present invention, when the touch input is detected from at least two individual items through the touch sensor unit 131, the controller 150 determines whether the touch input is maintained for a given period T (202) and, when it is determined that the touch input is maintained for the given period T, the controller 150 proceeds to step 203 to perform a process of determining the location of the folder item to be generated.

Figure 3:
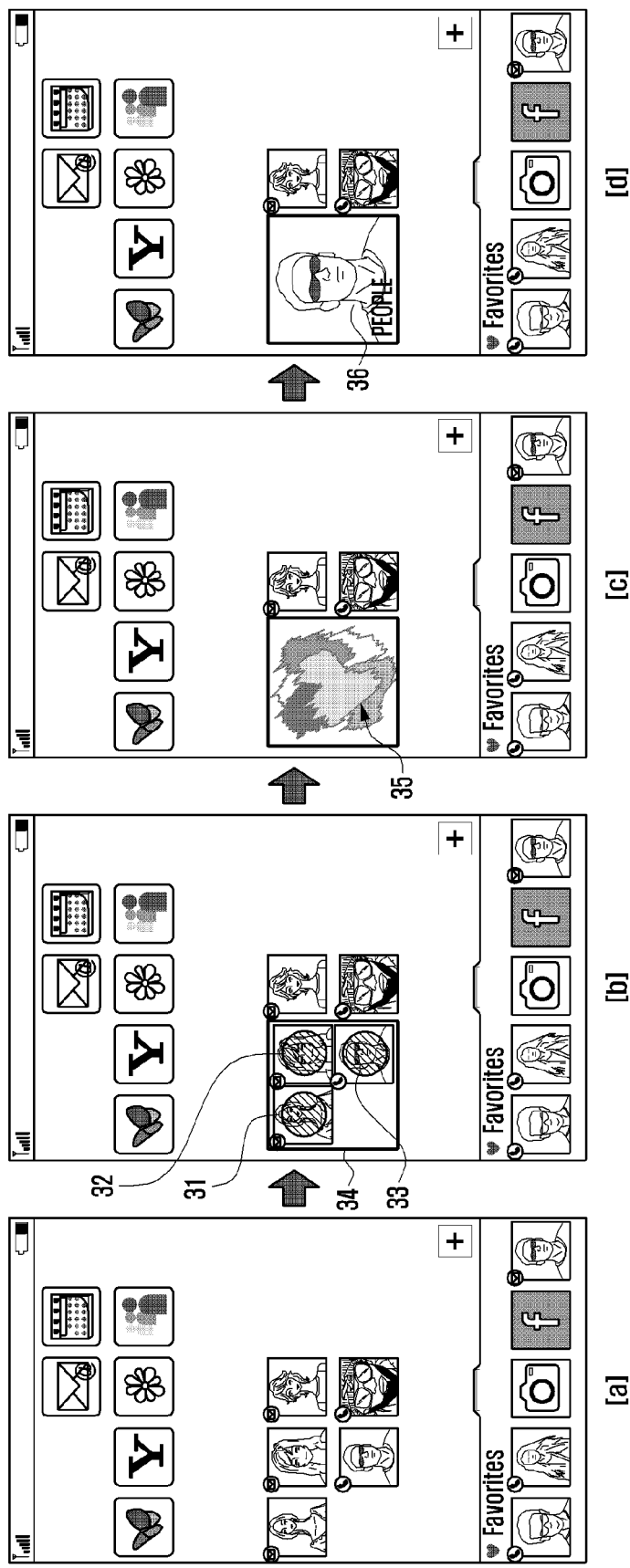
FIG. 3 illustrates example screen displays of a display apparatus that are displayed according to the method of FIG. 2.

FIG. 3 illustrates example screen displays of the display apparatus 100 that are displayed according to the method of FIG. 2.

FIG. 3[a] shows the home screen including a plurality of individual items. The individual items include an icon for running an application such as an email or a calendar and a contact icon comprising photographic images. The user can touch the contact icon to perform communication with the corresponding contact or view the history of communication such as calls, messages, or emails with the corresponding contact.

FIG. 3[b] shows a screen that is displayed when the user touches three icons 31, 32 and 33. In FIG. 3[b], an outline 34 of the folder item to be created extends along the perimeter of the three icons 31, 32 and 33. The outline 34 has a size corresponding to a total size of four contact icons. In FIG. 3[b], the controller 150 determines the location of the folder item to be created to include the three contact icons 31, 32 and 33 that are adjacent to one another and controls the display unit 132 to display the outline 34 including the three contact icons 31, 32 and 33.

FIG. 3[c] shows a screen that is displayed when the user releases a touch from the three contact icons 31, 32 and 33. In FIG. 3[c], an image 35 in which images of the three contact icons 31, 32 and 33 are combined is provided within the outline 34. The image 34 is displayed using a transition effect in which the images of the icons are integrated into one image, thereby providing an aesthetic feedback to the user. In particular, the user can receive a feedback on which icon is included in the folder item.

FIG. 3[d] shows a screen illustrating a result of creating the folder item. FIG. 3[d] illustrates the folder item 36 created along the outline 34 of the screen FIG. 3[b]. The folder item 36 has an image of the contact icon 33, which is one of the contact icons 31, 32 and 33 that receive the touch input, and has a folder name marked thereon as 'PEOPLE.' FIG. 3[d] shows a result of selecting one of the three contact icons 31, 32 and 33 using the controller 150 and configuring the folder item 36 to have the image of the selected contact icon.

According to an exemplary embodiment of the present invention, when the user enters a multi touch on the three contacts icons 31, 32 and 33 at different time intervals, the controller 150 can detect the contact icon of which a touch input is first received and configure the folder item 36 to have an image of the corresponding contact icon. The three contact icons 31, 32 and 33 are replaced by the folder item 36 and thus removed from the home screen.

FIG. 3[d] shows, the size of the folder item 36 is different than the size of the individual items (e.g., the contact icon or the icon for running an application) within the folder item. Therefore, even when the folder item and the individual item are located close to each other, the folder item is easily distinguishable from the other displayed individual items.

According to an exemplary embodiment of the present invention, the controller 150 controls the display unit 132 to display a folder item menu icon along with the folder item. When the user touches the folder item menu icon, the controller 150 controls the display unit 132 to display a 'change folder item image' menu and a 'change folder item name' menu in a particular location of the screen. When the user selects the 'change folder item image' menu, the controller 150 controls the display unit 132 to display a list of individual items grouped into the corresponding folder item. Here, the controller 150 controls the display unit 132 to display a 'check' mark on the image of the individual item, which is the same as the image of the folder item. When the user selects one of the individual items (e.g., touches the icon representing the item), the controller 150 controls the display unit 132 to display the image of the individual item selected by the user as the image of the folder item. When the user selects the 'change folder item name' menu, the controller 150 controls the display unit 132 to display a folder item name editing menu.

Figure 4:
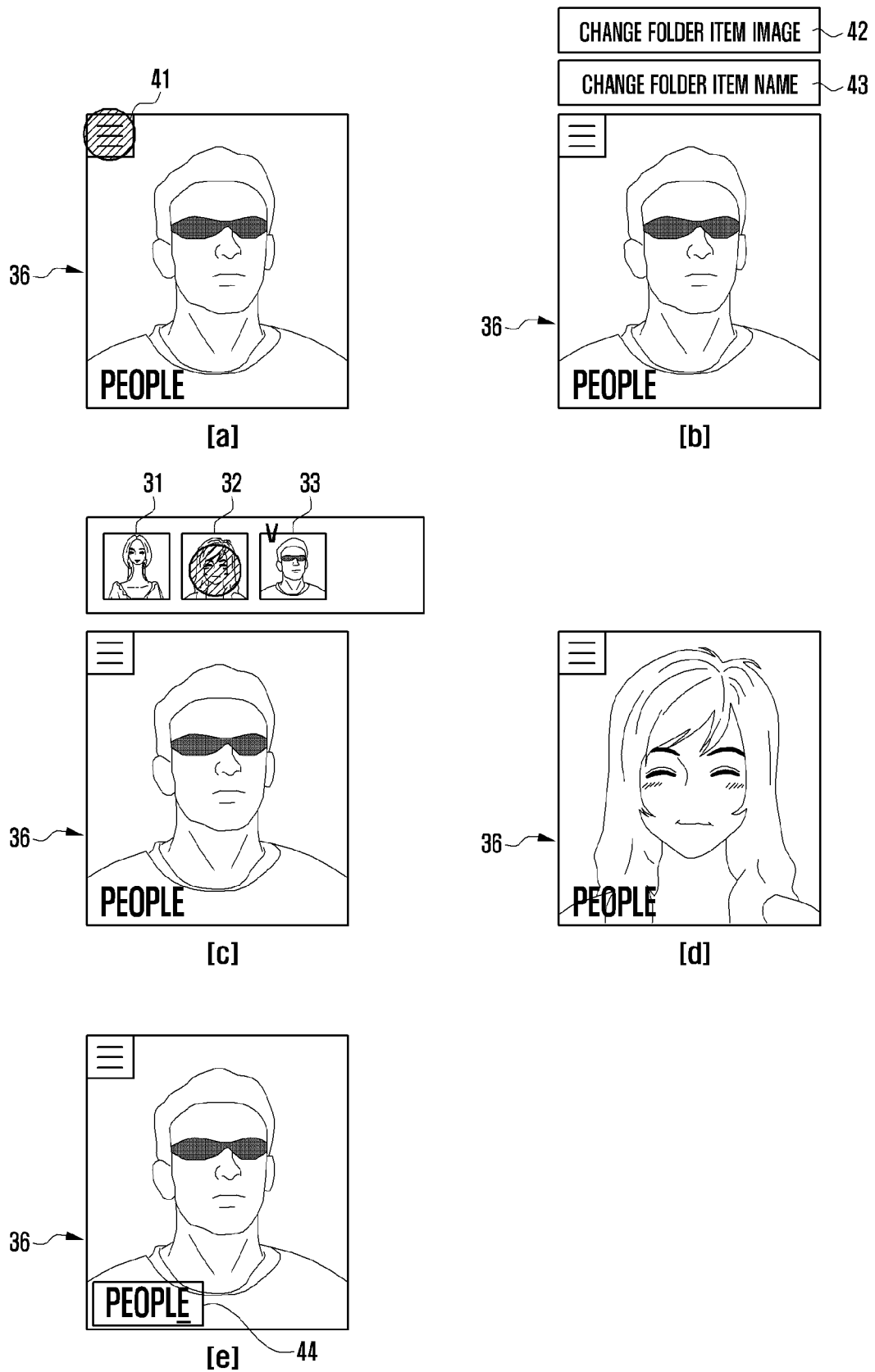
FIG. 4 is a view illustrating a method of changing a folder item image or a folder item name according to an exemplary embodiment of the present invention.

FIG. 4 is a view illustrating a method of changing a folder item image or a folder item name according to an exemplary embodiment of the present invention.

FIG. 4[a] illustrates the folder item 36 shown in FIG. 3[d] wherein the folder item 36 has a folder item menu icon 41 displayed. FIG. 4[b] shows is a screen that is switched from FIG. 4[a] when the user touches the folder item menu icon 41 (as indicated by the hashed circle element). In FIG. 4[b] a 'change folder item image' menu 42 and a 'change folder item name' menu 43 are placed above the folder item 36. FIG. 4[c] illustrates a screen that is switched when the user selects the 'change folder item image' menu 42 in the screen shown in FIG. 4[b].

FIG. 4[c] illustrates, a list of the contact icons 31, 32 and 33 that are grouped into the folder item 36 shown above the folder items 36. The contact icon 33 having the same image as the image of the folder item 36 has the 'check' mark thereon to show the currently selected image.

FIG. 4[d] illustrates a screen wherein icon 32 is shown as the image associated with the folder item 36 when the user selects the contact icon 32 in FIG. 4[c] (as indicated by the hash circle on icon 32). Thus, the image of the folder item 36 is changed to the image of the contact icon 32 to be displayed. In this manner, the user can change the image of the folder item by using a sub menu of the folder item.

FIG. 4[e] illustrates a screen that is switched when the user selects the 'change folder item name' menu 43. FIG. 4[e] shows an editing window 44 in which the folder item name can be changed. Thus, the user can change the name of the folder item 36 to a desired name by using the 'change folder item name' menu 43.

Figure 5:
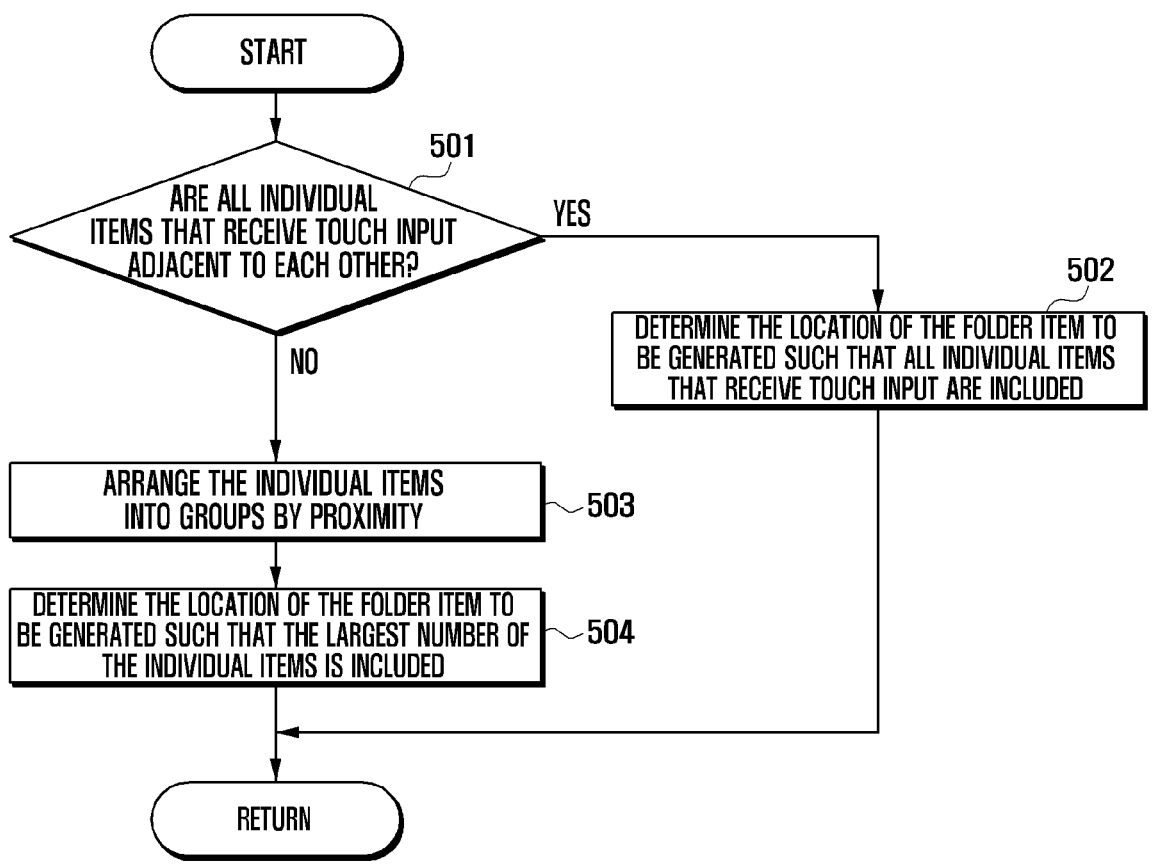
FIG. 5 is a flow chart illustrating in further detail the processing shown in FIG. 2.

FIG. 5 is a flow chart illustrating a detailed process of step 203 of FIG. 2. FIG. 5 illustrates a detailed process of determining the location of the folder item to be generated when the individual items of which touch inputs are received are not adjacent to each other.

In step 202 of FIG. 2, when the user enters a touch on at least two individual items, the controller 150 determines whether the at least two touched individual items are adjacent to each other (501). The individual items are considered to be adjacent to each other when the individual items are next to each other in a matrix array of the home screen in a horizontal direction or a vertical direction.

When the individual items are determined to be adjacent to each other, the controller 150 determines the location of the folder item to be created such that all the individual items that receive the touch input are included (502). For example, when the size of the folder item to be created is four times the size of the individual item, and the user enters the multi touch on three individual items that are adjacent to one another, the controller 150 can determine the location of the folder item to be created such that the three individual items from which the touch inputs were received are included.

When it is determined that the individual items of which touch inputs are received are not adjacent to each other at step 501, the controller 150 arranges the individual items into groups by proximity to each other (503). For example, when the user enters the multi touch on the three individual items, of which two are adjacent to each other and one is spaced apart from the other two, the controller 150 categorizes the neighboring two individual items as a first group and categorizes the third, separated, individual item as a second group.

Next, the controller 150 determines the location of the folder item to be generated such that the group having the largest number of the individual items is included (504). In the above described example, the controller 150 determines the location of the folder item to be created such that the first group containing the two neighboring individual items IS included.

When the user releases a touch, the controller 150 performs the process of creating the folder item, wherein the display unit 132 is controlled to show the individual items spaced apart from one another moving into the folder item. The controller 150 can control the display unit 132 to display an image resulting from combining images of the individual items located within the outline of the folder item.

When determining the location of the folder item to be generated, the controller 150 can determine the location such that the individual item that receives the touch input is included while the individual item that does not receive the touch input is not included. Alternatively, the controller 150 can determine the location of the folder item such that the individual item that receives the touch input is included while the individual item that does not receive the touch input is minimally included.

Figure 6:
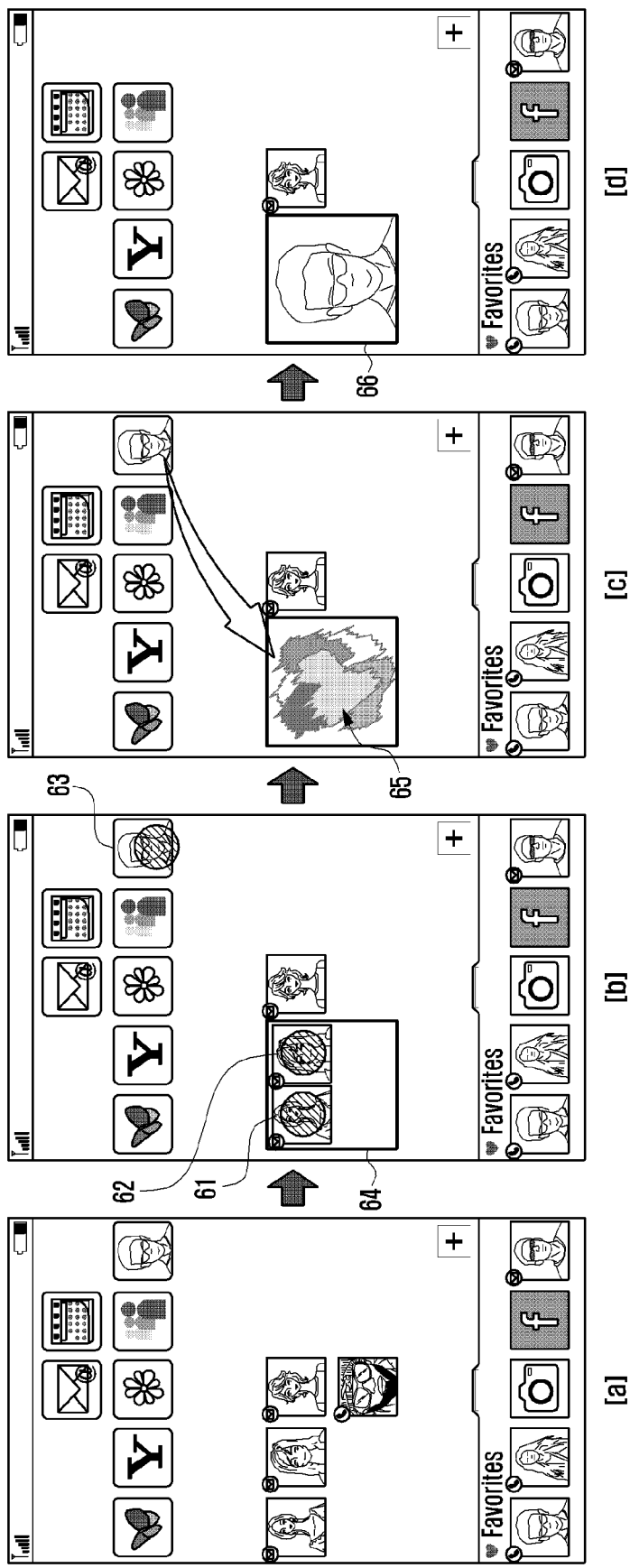
FIG. 6 illustrates example screen displays of a display apparatus that are displayed according to the methods of FIGS. 2 and 5.

FIG. 6 illustrates example screen displays of the display apparatus 100 that are displayed according to the methods of FIGS. 2 and 5.

FIG. 6[a] illustrates a home screen including a plurality of individual items and FIG. 6[b] illustrates a screen displayed when the user enters the touch input on three contact icons 61, 62 and 63. FIG. 6[b] illustrates a folder item outline 64 including the two contact icons 61 and 62. The outline 64 has a size corresponding to the total size of four individual items, as three icons have been selected (as indicated by the hashed circle element). The contact icon 63 is spaced apart from the contact icons 61 and 62. In FIG. 6[b] the controller 150 determines the location of the folder item to be generated such that the two neighboring contact icons 61 and 62 are included and controls the display unit 132 to display the outline 64 including the contact icons 61 and 62.

FIG. 6[c] corresponds to a screen displayed when the user releases the touch from the three contact icons 61, 62, and 63. FIG. 6[c] shows an image 65 into which the contact icons 61 and 62 are integrated wherein the contact icon 63 moves within the outline 64. Thus, the screen associated with FIG. 6[c] of provides feedback to the user that the three selected icons 61, 62, and 63 are arranged within one folder item.

FIG. 6[d] is a screen showing a resultant folder item that is created. In FIG. 6[d], the folder item 66 is shown to be formed along the outline 64. The folder item 66 has the same image as an image of the contact icon 63 and has a folder name as 'PEOPLE.'

Figure 7:
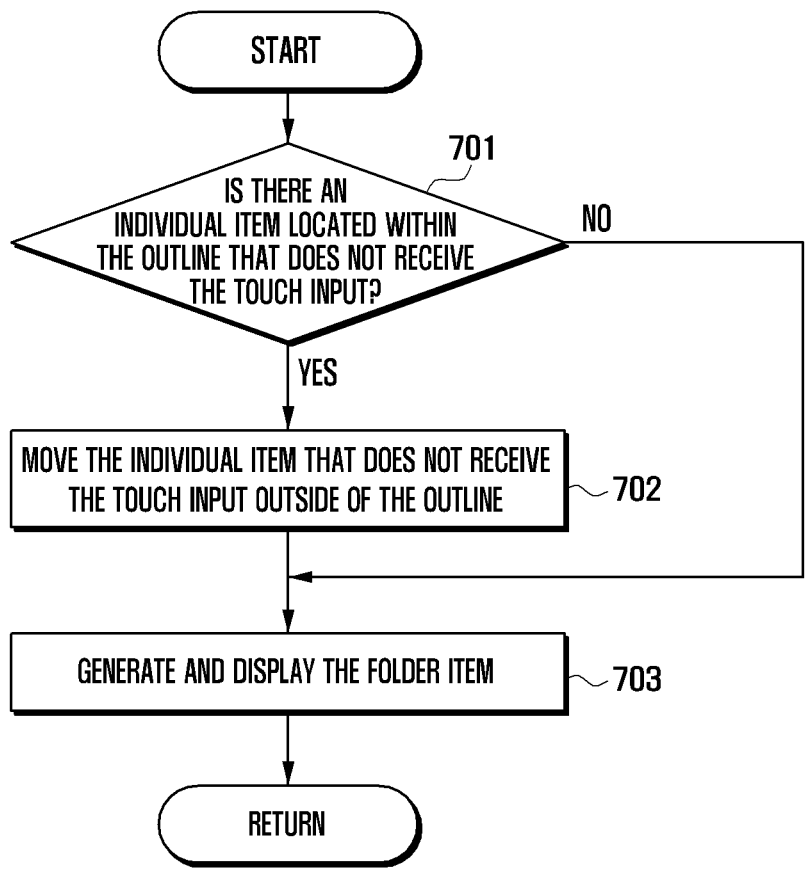
FIG. 7 is a flow chart illustrating in further detail the processing shown in FIG. 2.

FIG. 7 is a flow chart illustrating a detailed process of creating and displaying the folder item when the individual item that does not receive the touch input is located within the outline of the folder item (step 206 in FIG. 2).

When the touch is released at step 205 of FIG. 2, the controller 150 determines whether there is an individual item located within the outline that did not receive the touch input (step 701). Because the folder item to be created has a size larger than that of the individual item, not only the selected (i.e., touched) individual item but also the individual item for which a touch input has not received can be included within the outline of the folder item.

When it is determined that all the individual item within the outline have been selected (i.e., touched), the controller 150 creates the folder item within the outline and controls the display unit 132 to display the created folder item (step 703).

When it is determined that the individual item for which touch input has not been received is located within the outline, the controller 150 controls the display unit 132 to display a screen in which the individual item of the non-selected individual items is moved outside of the outline (step 702). With respect to the selected individual items, the controller 150 controls the display unit 132 to display an image in which images of the individual items are integrated. With respect to the non-selected individual items, the controller 150 controls the display unit 132 to display the individual item being moved outside of the outline. That is, the individual item without the outline from which a touch input was not received, is moved outside the outline. In this manner, the user can receive a feedback as to which individual items are categorized into the folder item.

Figure 8:
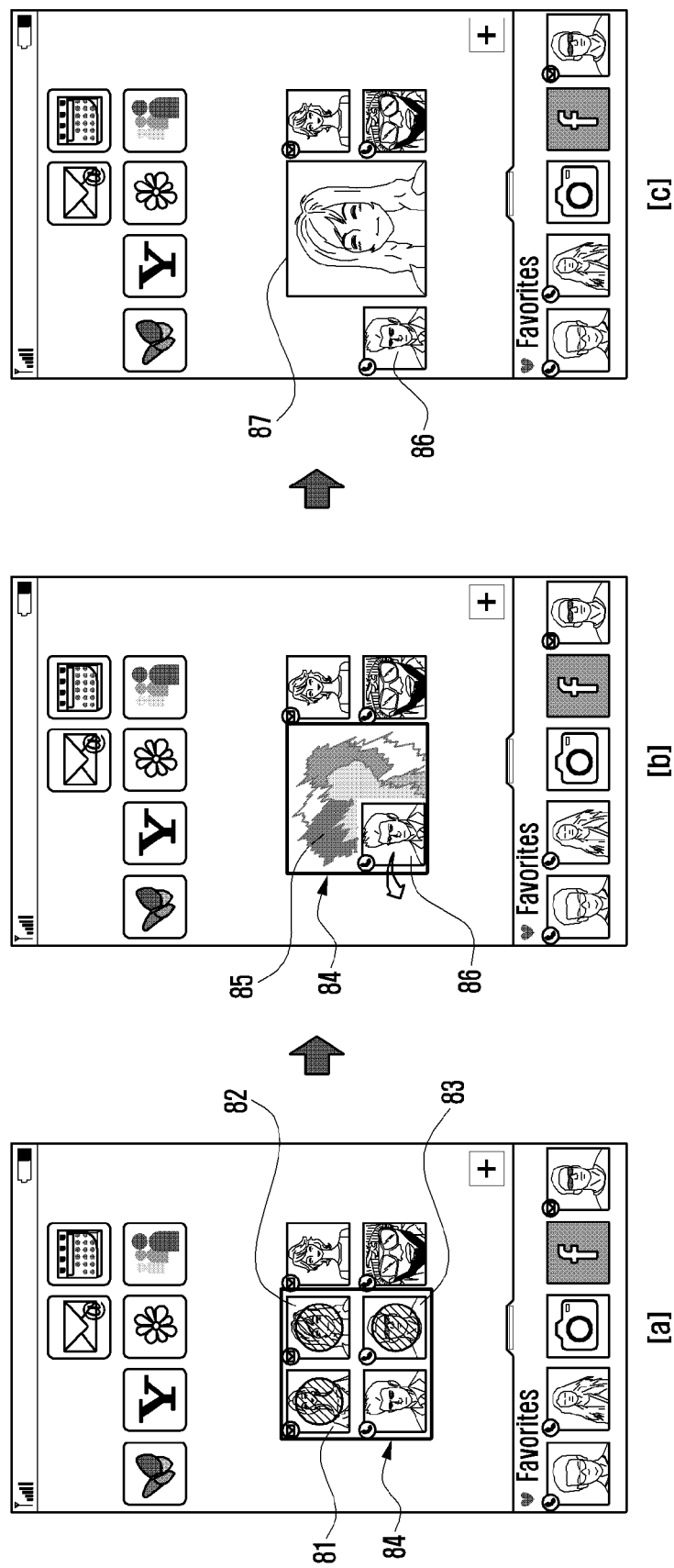
FIG. 8 illustrates example screen displays of a display apparatus that are displayed according to the methods of FIGS. 2 and 7.

FIG. 8 illustrates example screen displays of the display apparatus 100 that are displayed according to the methods of FIGS. 2 and 7.

FIG. 8[a] illustrates a screen when the user touches three contact icons 81, 82, and 83 (as indicated by the hashed circle). FIG. 8[a] shows an outline 84 of the folder item that includes the three selected contact icons 81, 82, and 83. The outline 84 in [a] of FIG. 8 has a size corresponding to a total size of four contact icons. Also shown is icon 86 that is not selected but within the outline 84.

FIG. 8[b] is a screen displayed when the user releases the touch from the three contact icons 81, 82, and 83. FIG. 8[b] shows an image 85 in which the contact icons 81, 82, and 83 are integrated and non-selected contact icon 86 is moved outside of the folder item outline 84 (as indicated by the arrow designation). Thus, FIG. 8[b] provides the user with the information that the contact icons 81, 82, and 83 are arranged within one folder and the contact icon 86 is excluded from the folder.

FIG. 8[c] is a screen showing a resultant folder item that is created. FIG. 8[c] displays a folder item 87 formed along the outline 84 shown in FIG. 8[a]. The folder Item 87 has the same image as an image of the contact icon 82. Also, the contact icon 86 that is not selected by the user is displayed next to the folder item 87 in FIG. 8[c].

According to an exemplary embodiment of the present invention, when determining the location of the folder item to be created at step 203 of FIG. 2, the controller 150 can determine the shape of the folder item. The controller 150 can determine the shape of the folder item according to an arrangement pattern of the individual items selected by the user. For example, if the user enters the multi touch on three individual items that are arranged in a shape of 'L,' the controller 150 can determine the shape of the folder item as the shape of 'L.' Also, if the user enters the multi touch on three individual items that are arranged in a shape of 'straight line,' (vertical or horizontal) the controller 150 can determine the shape of the folder item as the shape of a 'straight line."

Figure 9:
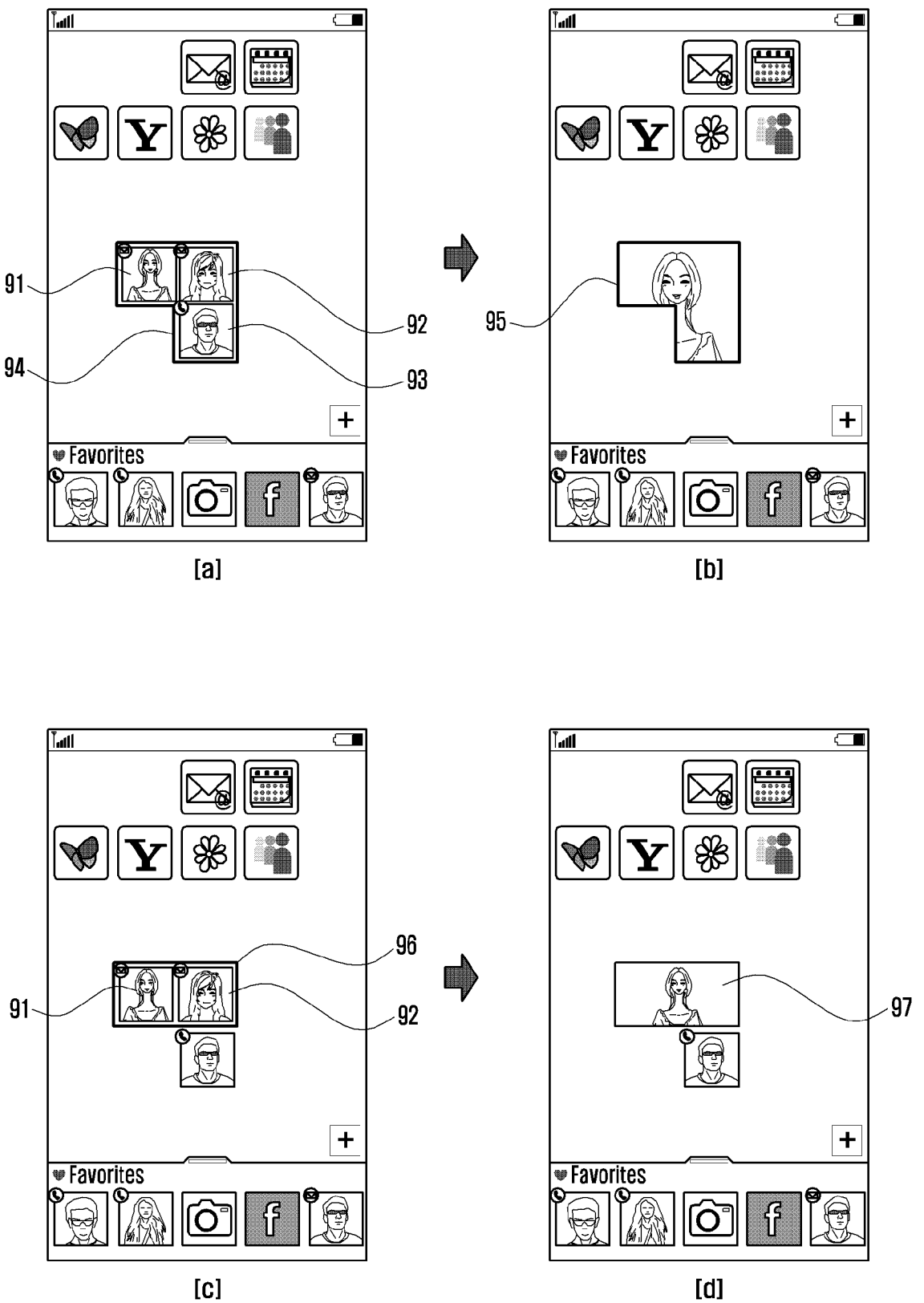
FIG. 9 illustrates example screen displays of an embodiment in which the shape of a folder item is determined according to the arrangement of individual items that form the folder item.

FIG. 9 illustrates example screen displays of an embodiment in which the shape of a folder item is determined according to the arrangement of individual items that form the folder item.

FIG. 9[a] of is a screen displayed when the user enters the multi touch on contact icons 91, 92, and 93 that are arranged in a shape of 'L.' FIG. 9[a] displays an outline 94 surrounding the three contact icons 91, 92, and 93. The outline 94 has the same arrangement pattern as the arrangement pattern of the three contact icons 91, 92, and 93.

FIG. 9[b] of displays a resultant folder item that is created subsequent to display of [a] of FIG. 9. FIG. 9[b] displays a folder item 95 formed along the outline 94 shown in FIG. 9[a]. The folder item 95 has the same image as an image of the contact icon 91; however, the because of the shape of the folder item, the folder item 95 has a part of the image of the contact icon 91.

FIG. 9[c] illustrates a display when the user enters the multi touch on the contact icons 91 and 92 that are arranged in a shape of 'straight line.' FIG. 9[c] displays an outline 96 surrounding two contact icons 91 and 92. The outline 96 has the same arrangement pattern as the arrangement pattern of the two contact icons 91 and 92.

FIG. 9[d] displays a resultant folder item that is created subsequent to display of FIG. 9[c].

FIG. 9[d] displays a folder item 97 formed along the outline 96 shown in FIG. 9[c]. The folder item 97 has the same image as an image of the contact icon 91. Thus, the user can determine from the shape of the folder item how many individual items are currently contained in the folder item.

Figure 10:
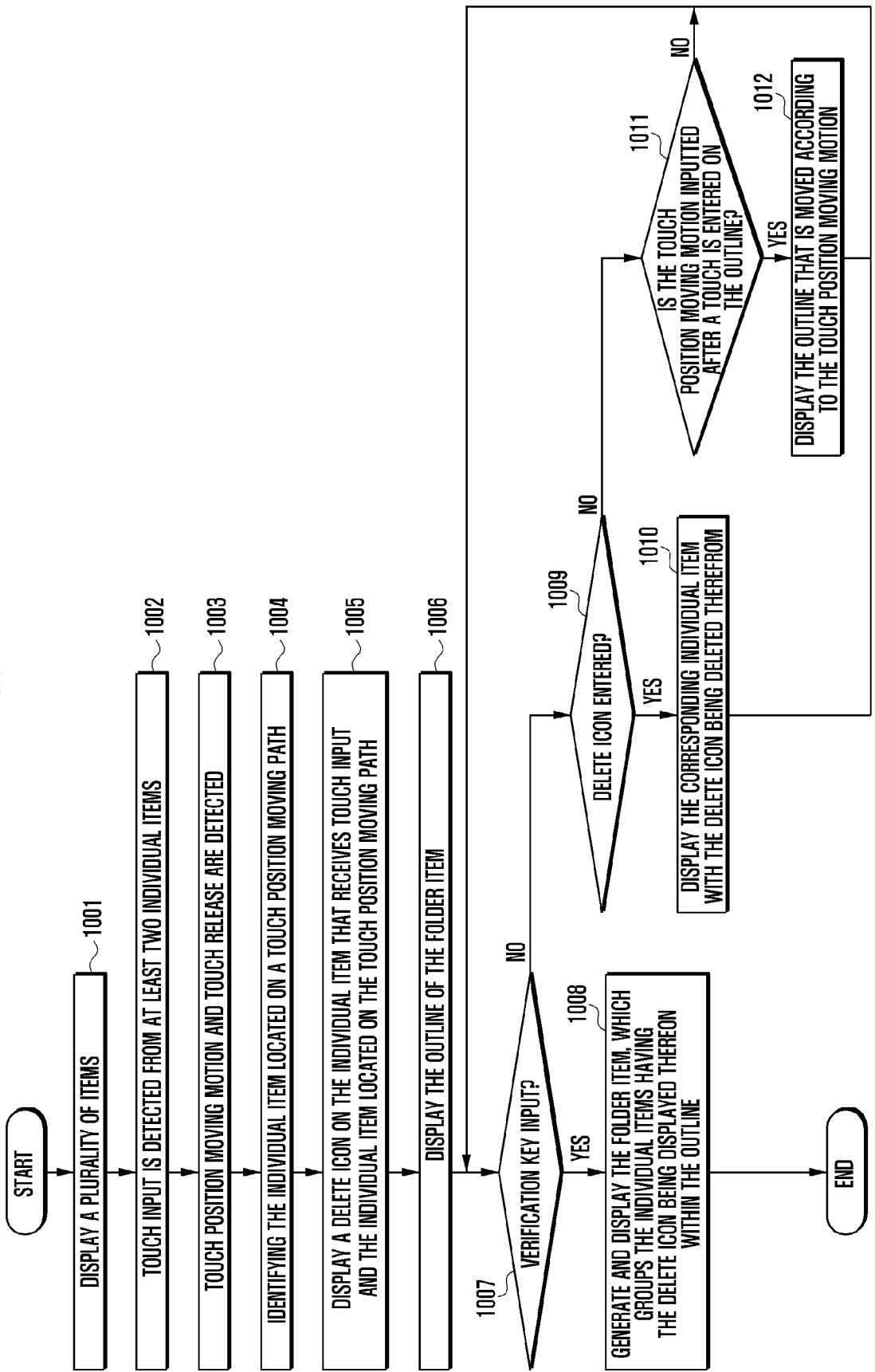
FIG. 10 is a flow chart illustrating an item display control method of a display apparatus according to another exemplary embodiment of the present invention.

FIG. 10 is a flow chart illustrating an item display control method for the display apparatus 100 according to another exemplary embodiment of the present invention.

The controller 150, through the display unit 132, displays a plurality of individual items (1001). The controller 150, through the display unit 132, displays the home screen or main menu screen including the plurality of the individual items.

When the user enters the multi-touch on the plurality of the individual items, the controller 150 detects the touch input from at least two individual items through the touch sensor 131 (1002). Next, when the user enters the touch position moving motion and releases the touch, the controller 150 detects the touch position moving motion and the touch release through the touch sensor 131. In the present invention, the touch position moving motion can be a flick, which moves the touch at a given speed or higher, or a drag, which moves the touch at a rate lower than the given speed.

When the touch position moving motion and the touch release are detected, the controller 150 identifies the individual item located on the touch position moving path (1004). Next, the controller 150 controls the display unit 132 to display a delete icon on the individual item of which touch input is received and the individual item located on the touch position moving path (1005). In the present invention, the delete icon is an icon for selecting the individual item to be excluded from the folder item. When the user selects the delete icon, the selected individual item is excluded from a list of the individual items to be contained in the folder item.

The controller 150 controls the display unit 132 to display an outline of the folder item to be generated (1006). The controller 150 controls the display unit 132 to display the outline in a preset area (for example, a central area of the display unit 132). Also, the controller 150 can determine the location of the folder item to be generated to include at least one of the individual items having the delete icon displayed thereon, and control the display unit 132 to display the outline of the folder item to be generated on the determined location. Also, the controller 150 can determine the location of the folder item to be generated such that a maximum number of the individual items having the delete icon displayed thereon can be included, and control the display unit 132 to display the outline of the folder item to be generated on the determined location. Further, the controller 150 can determine the location of the folder item to be generated at an intermediate point between the individual items from which a touch input was received and control the display unit 132 to display the outline of the folder item to be generated.

The controller 150 determines whether a verification key is entered through the touch sensor 131 or the key input unit 140 (1007). In the present invention, the verification key, which is a key for completing the process of creating the folder item, can be implemented as a button style key or can appear on the display unit 132. For example, the verification key can be a home button on the key input unit 140 or a pop up key displayed on the display unit 132.

If it is determined that the verification key is entered, the controller 150 generates the folder item which groups the individual items having the delete icon being displayed thereon within the outline, and controls the display unit 132 to display the created folder item (1008). Here, the controller 150 can configure the folder item to have an image of one of the individual items of which touch input is received.

If it is determined that the verification key is not entered at step 1007, the controller 150 determines if the delete icon is entered (1009). If it is determined that the delete icon is entered, the controller 150 controls the display unit 132 to display the corresponding individual item with the delete icon being deleted therefrom (1010). Here, the controller 150 excludes the individual item of which delete icon is entered from the individual items to be included in the folder item. Next, the controller 150 proceeds to step 1007 to determine if the verification key is entered, and if it is determined that the verification key is entered, the controller 150 controls the display such that only the individual items that are not to be deleted are grouped into the folder item and the individual items that have been indicated to be deleted are excluded.

If it is determined that the delete icon is not entered at step 1009, the controller 150 determines, through the touch sensor unit 131, whether a touch is entered on the outline and thereafter the touch position moving motion is inputted (1011). When it is determined, through the touch sensor unit 131, that the touch position moving motion inputted after the touch is entered on the outline, the controller 150 controls the display unit 132 to display the outline that has been moved according to the touch position moving motion. Next, the controller 150 proceeds to step 1007 and, if it is determined that the verification key is entered, the folder item is created within the currently displayed outline.

Figure 11:
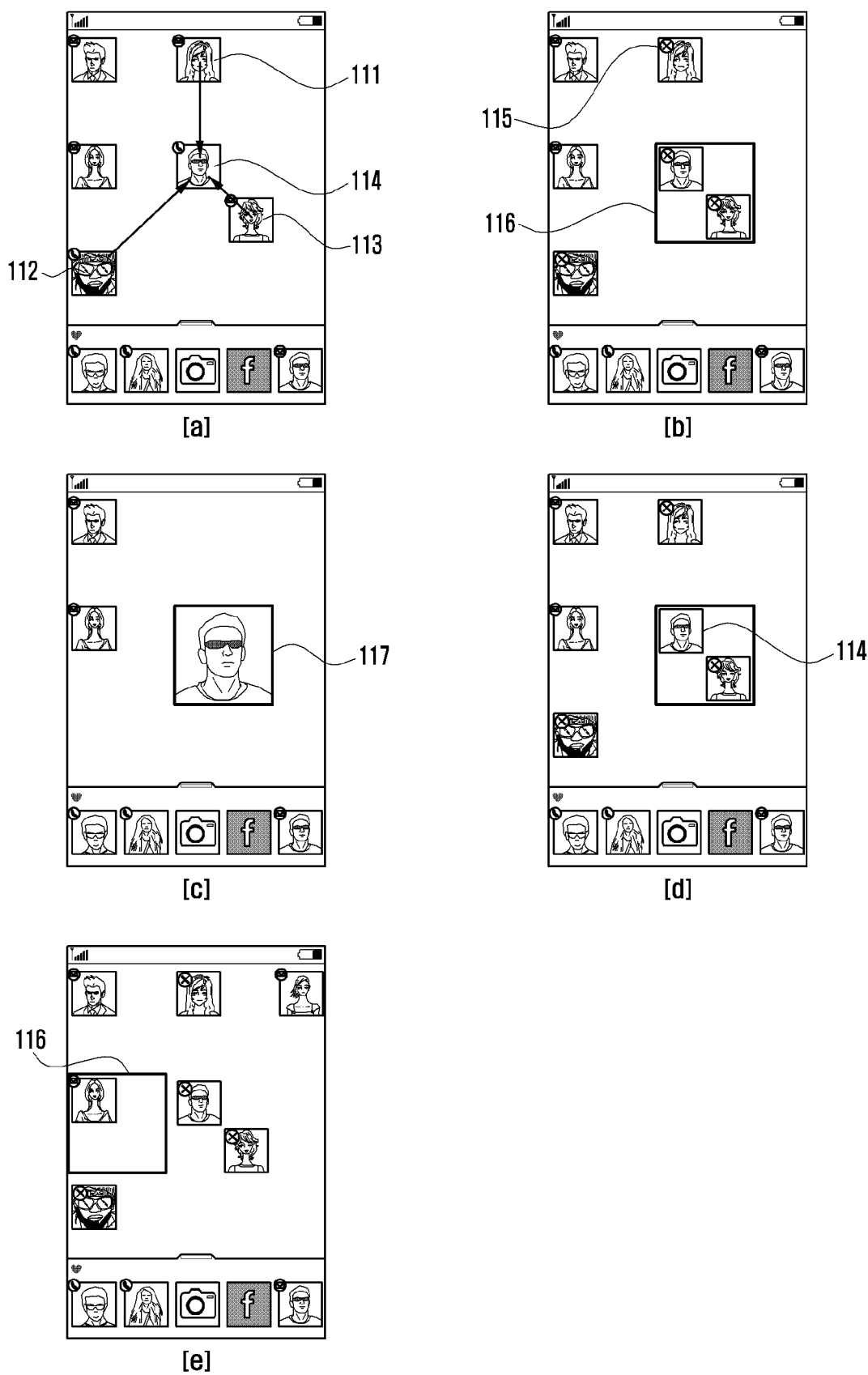
FIG. 11 is example screen displays of a display apparatus that are displayed according to the method of FIG. 10.

FIG. 11 is example screen displays of the display apparatus 100 that are displayed according to the method of FIG. 10.

FIG. 11[a] illustrates a home screen including a plurality of the individual items in which the user enters a touch on contact icons 111, 112, and 113. The touch position moving motion is entered in a direction toward a contact icon 114. Here, it is assumed that the touch position moving motion of the user crosses the contact icon 114.

FIG. 11[b] illustrates a screen that is switched according a user input. In FIG. 11[b], a delete icon 115 is displayed on the contact icons 111, 112, and 113 of which touch input is entered and the contact icon 114 to which the touch position moving path is directed to, and an outline 116 of the folder item to be generated is displayed. The outline 116 has a size corresponding to a total size of four contact icons and includes the contact icons 113 and 114.

FIG. 11[c] illustrates a result of creating the folder item. When the user enters the verification key in FIG. 11[b], the contact icons 111, 112, 113, and 114 on which the delete icon 115 is displayed are removed from the screen and a folder item 117 is generated. The folder item 117 is formed within the outline 116 shown in FIG. 11[b]. In FIG. 11[c], the folder item 117 has an image associated with the contact icon 114, which is one of the contact 111, 112, 113, and 114 having the delete icon 115 being displayed thereon.

FIG. 11[d] is a screen that is switched when the user touches the delete icon 115 displayed on the contact icon 114 shown in [b] of FIG. 11. In the contact icon 114 of FIG. 11[d], the delete icon 115 is removed and does not appear on the contact icon 114. Next, when the user enters the verification key, the controller 150 configures the folder item to have only the contact icons 111, 112, and 113 on which the delete icon 115 is currently displayed, while excluding the contact icon 114.

FIG. 11[*e*] corresponds to a screen when the user enters the touch position moving motion after touching the outline 116 in FIG. 11[*b*]. Compared to FIG. 11[*b*], the outline 116 in FIG. 11[*e*] is moved to the left. Next, when the user enters the verification key, the controller 150 controls the display unit 132 to display the folder item generated within the outline 116 that has been moved.

The above-described methods according to the present invention can be realized in hardware or as software or computer code that can be stored in a recording medium such as a CD, a ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. As would be recognized by those skilled in the art, when a general purpose computer is loaded with, or accesses, software or code for implementing the processing shown herein, the general purpose computer is transformed into a special purpose computer that may at least perform the processing shown herein.

According to the present invention, a user can enter into a process of creating a folder item through a multi-touch input and can appreciate in advance the shape and the size of the folder item to be created by the outline of the folder item that is displayed before creating the folder item. Also, the folder item is configured to have a size different from that of the individual item so that identifying the folder item becomes easy even when the folder item and the individual item are closely located.

What is claimed is:

1. A method, operable in a processor of a computing device, for controlling a display of a plurality of individual items, the method comprising:
   displaying the plurality of individual items;
   in response to receiving a touch input simultaneously selecting at least two individual items of the plurality of individual items, displaying a preview outline enclosing the at least two individual items; and
   in response to a release of the touch input, generating a folder item with a size according to the preview outline and a number of the individual items for which the touch input is received, and storing the at least two individual items in the folder item.

2. The method of claim 1, wherein the generated folder item has an area larger than an area of the at least two individual items.

3. The method of claim 2, wherein the displaying of the outline further comprises:
   determining a location of the folder item to be generated such that at least one of the individual items from which touch inputs are received is included.

4. The method of claim 3, wherein the displaying of the preview outline further comprises:
   generating the preview outline in which the individual items from which touch inputs are received are combined for display.

5. The method of claim 1, wherein the displaying of the preview outline further comprises:
   determining the number of the individual items from which touch inputs are received;
   determining a location of the folder item such that at least one of the individual items from which the touch inputs were received is included therein; and
   displaying the preview outline of the folder item to be generated on the determined location.

6. The method of claim 1, wherein the receiving of the touch input comprises:
   detecting an input of a touch position moving motion.

7. The method of claim 1, wherein the displaying of the generated folder item comprises:
   receiving a touch release input;
   displaying a transition effect in which images of the individual items from which touch inputs are received are integrated into one image; and
   configuring the generated folder item to have an image of one of the individual items from which touch inputs are received and displaying the image of the generated folder item.

8. The method of claim 1, further comprising:
   displaying, when a predefined key input is received, a change folder item image menu;
   displaying, when the change folder item image menu is selected, a list of the individual items arranged therein; and
   receiving a selection of one of the individual items from the list of the individual items and configuring the folder item to have an image of the selected one of the individual items.

9. The method of claim 3, wherein the determining of the location of the folder item comprises:
   determining whether the individual items from which touch inputs are received are adjacent to each other;
   determining, when the individual items from which touch inputs are received are determined to be adjacent to each other, the location of the folder item such that all of the individual items from which touch inputs are received are included;
   when at least one individual item is determined to be spaced apart, arranging all of the individual items from which touch inputs are received into groups based on proximity indicated by adjacentness between each of the individual items; and
   determining the location of the folder item such that a group having a largest number of the individual items is included.

10. The method of claim 9, wherein the displaying of the generated folder item comprises:
    determining whether there exists an individual item from which a touch input was received and is located outside of the outline; and
    moving the individual item from which a touch input was received and is located outside of the outline such that the individual item is located within the outline to be displayed.

11. The method of claim 1, wherein the displaying of the generated folder item comprises:
    determining whether there exists an individual item from which a touch input was not received and is located within the outline;
    moving the individual item that does not receive the touch input and is located within the outline such that the individual item from which a touch input was not received is located outside of the outline to be displayed; and displaying the generated folder item within the preview outline.

12. A method, operable in a processor, for controlling a display of a plurality of items on a display unit, the method comprising:
   in response to receiving a touch input, a touch position moving motion, and a touch release input on at least two of displayed individual items of the plurality of items: displaying a delete icon on one of the at least two individual items and another individual item located on a moving path of the touch position moving motion, and displaying a preview outline enclosing at least the another individual item; and
   in response to receiving a confirmation input, generating and displaying a folder item according to the preview outline, and storing the at least two displayed individual items and the another individual item in the generated folder item.

13. The method of claim 12, further comprising:
   removing any particular individual item from inclusion in the generated folder item when the delete icon for the particular individual item is selected; and
   moving the outline in response to a touch gesture selecting and dragging the outline.

14. A display apparatus comprising:
   a display unit configured to display a plurality of individual items;
   a touch sensor unit configured to detect a multi-touch input causing simultaneous selection of at least two individual items of the plurality of individual items; and
   a controller configured to:
      in response to the touch sensor unit detecting the touch input, determine a location of a folder item to be generated upon release of the touch input, the location based on at least one of the individual items, and display a preview outline enclosing the at least one of the individual items for which the location is based,
      in response to the release of the touch input, generate and display the folder item on the display with a size according to the preview outline and a number of the individual items for which touch inputs is received, and store the at least two individual items in the generated folder item.

15. The display apparatus according to claim 14, wherein the controller is configured to control such that the generated folder item has an image of one of the individual items that receive the touch inputs and the image of the folder item is displayed by the display unit.

16. A terminal comprising:
   a display unit;
   an input unit; and
   a processor in communication with a memory, the memory containing code, which when accessed by the processor causes the processor to:
      display a plurality of individual items on the display unit;
      receive at least two inputs from the input unit, the received at least two inputs causing simultaneous selection of at least two individual items of the plurality of individual items;
      in response to receiving the at least two inputs, display a preview outline area enclosing the at least two individual items and establish a location based on the outline area; and
      in response to a release of the received at least two inputs, remove the at least two individual items from the display unit, generate a new folder item according to the preview outline area at the established location, and store the at least two individual items in the generated new folder item,
      wherein the location of the preview outline area is determined at an intermediate point of the at least two inputs.

17. The terminal of claim 16, wherein the code further causes the processor to:
   identify the preview outline area by one of the individual items contained within the preview outline area.

18. The terminal of claim 16, wherein the code further causes the processor to:
   remove from within the preview outline area individual items on which the at least two inputs were not received.

19. The terminal of claim 16, wherein said preview outline area is formed around a maximum number of adjacent individual items on which the at least two inputs were received.

* * * * *